United States Patent [19]

Roberts et al.

[11] 4,096,107
[45] Jun. 20, 1978

[54] MOLDING COMPOUNDS

[75] Inventors: Michael Graeg Roberts, Heath; Charles Edwin Bolen, Newark, both of Ohio

[73] Assignee: Owens-Corning Fiberglas Corporation, Toledo, Ohio

[21] Appl. No.: 741,273

[22] Filed: Nov. 12, 1976

[51] Int. Cl.² .......................... C08K 3/40; C08K 5/01
[52] U.S. Cl. .......................... 260/33.6 UA; 260/40 R; 260/862
[58] Field of Search .............. 260/33.6 UA, 862, 40 R

[56] References Cited

U.S. PATENT DOCUMENTS

| | | | |
|---|---|---|---|
| 3,956,421 | 5/1976 | Roberts et al. | 260/33.6 UA |
| 3,998,909 | 12/1976 | Roberts et al. | 260/862 |

*Primary Examiner*—Donald E. Czaja
*Assistant Examiner*—H. H. Fletcher

*Attorney, Agent, or Firm*—Ronald C. Hudgens; Philip R. Cloutier; Keith V. Rockey

[57] ABSTRACT

A molding composition and method for the preparation of same wherein the molding composition is formulated of an unsaturated thermosetting prepolymer, a thermoplastic polymer prepared by interpolymerization of (1) a polymerizable ethylenic monomer, (2) an organic acid or anhydride containing at least one carboxyl group and one double bond per molecule, (3) an unsaturated elastomer having an average molecular weight less than 40,000 and (4) an unsaturated elastomer having an average molecular weight greater than 43,000, an unsaturated cross-linking agent which is capable of serving as a solvent for the prepolymer and the thermoplastic polymer and a non-reactive solvent. The combination of the thermoplastic polymer and the non-reactive solvent are believed to act together to reduce the amount of shrinkage of the thermosetting prepolymer when the latter is cured with the cross-linking agent.

26 Claims, No Drawings

MOLDING COMPOUNDS

This invention relates to improved sheet and/or bulk molding compounds, and more particularly to improved sheet and bulk molding compounds and a method for their preparation in which molded articles produced therefrom have improved shrink characteristics.

Molding compounds formulated of thermosetting prepolymers, most frequently in the form of an unsaturated polyester, have been in widespread use for quite some time. Such molding compounds are usually blended to include various fillers, notably glass fibers in the form of either continuous strands and/or filaments or chopped glass fibers. In the manufacture of molded articles from such molding compounds, a cross linking agent is added to the molding compound, and the resulting combination of polyester resin and reinforcement and/or filler is cured. One of the problems which has been encountered in the curing of unsaturated prepolymers is that prepolymers, when cured by condensation with an unsaturated solvent, such as styrene, the molded product usually exhibits shrink, and sink as well as a dull surface. Such molded articles contain glass fiber reinforcement, the shrink in the cured resin produces an imprint of the glass fiber reinforcement on the surface of the molded product.

To minimize that problem, it was discovered many years ago that shrink can be reduced and the surface dullness minimized when the prepolymer is mixed with a thermoplastic resin. Thus, the thermoplastic resin, prior to cure, separates from the thermosetting prepolymer to form a composition in which the thermoset resin constitutes a continuous phase in which particles of the thermoplastic resin are distributed. The thermoplastic resin distributed in the continuous phase thus volumetrically decreases the amount of shrink incurred on curing of the composite. As will be appreciated by those skilled in the art, the greater the content of the thermoplastic resin, the greater is its effect in volumetrically reducing shrink.

One of the difficulties which has been incurred in the prior art as outlined above stems from the fact that the thermoplastic resin is an expensive component of the molding compound. Even with the use of the thermoplastic resin as an additive to reduce shrink, there is still room for considerable improvement in terms of the surface characteristics of the final molded compound produced from such molding compounds.

It is accordingly an object of this invention to produce and to provide a method for producing a sheet and/or bulk molding compound having significantly improved shrinkage characteristics.

It is a more specific object of the invention to produce and to provide a method for producing a molding compound suitable for use in the manufacture of molded articles having reduced shrinkage and improved surface characteristics, at low cost.

The concepts of the present invention reside in a molding composition which is formulated to include
(a) an unsaturated, thermosetting prepolymer;
(b) a thermoplastic polymer prepared by the interpolymerization of at least one polymerizable ethylenic monomer, a mono- or polyfunctional organic acid (or anhydride thereof) containing one double bond per molecule, an elastomer having a molecular weight less than 40,000 and an elastomer having a molecular weight in excess of 43,000;
(c) at least one unsaturated compound which is a solvent for both the prepolymer and the thermoplastic polymer and which is capable of cross linking the prepolymer, and
(d) a non-reactive solvent, preferably in the form of an aromatic hydrocarbon. It is quite unexpected that the presence of a non-reactive solvent, which serves to displace a portion of the thermoplastic polymer, can be effective in promoting reduced shrinkage and improved surface characteristics in the final molded product since one skilled in the art would expect the nonreactive solvent to simply reduce the effect of the thermoplastic polymer. Without limiting the invention as to theory, it is believed that the combination of the non-reactive solvent and the defined thermoplastic polymer act together to reduce shrinkage and improve the surface characteristics of the final molded product.

The unsaturated thermosetting resins used in the practice of this invention are those conventionally employed in the prior art, notably as described in U.S. Pat. Nos. 3,925,299, 3,925,300 and 3,489,707. Generally, such unsaturated thermosetting resins are polyester resins prepared, for example, by condensation of an alpha, betaethylenically unsaturated dicarboxylic acid or anhydride (or mixtures thereof) with a dihydric alcohol (or mixtures of dihydric alcohols). The most preferred unsaturated polyesters are those produced by reaction of either maleic or fumaric acids (or anhydrides) with alkane diols and their corresponding glycols containing 2 to 10 carbon atoms. Representative compounds include ethylene glycol, propylene glycol, dipropylene glycol, diethylene glycol, 1,3-butanediol, etc., as well as mixtures thereof.

The unsaturated thermosetting polyester resins described above can be prepared in accordance with procedures well known to those skilled in the art. Generally, the acid or anhydride is reacted with the dihydric alcohol at a temperature ranging from 90° to 400° F. The reaction is usually terminated when an acid number less than about 100 is reached, most frequently by the use of an inhibitor such as toluhydroquinone, hydroquinone, the methyl ester of hydroquinone, m-dinitrobenzene and like known inhibitors.

It is an important concept of the present invention that the thermoplastic polymer component of the molding composition be prepared from two different elastomers of differing molecular weights as described above. As indicated, the thermoplastic polymer is prepared by the interpolymerization of at least one polymerizable ethylenic monomer, a mono- or polyfunctional organic acid (or anhydride) containing one double bond per molecule, an elastomer having an average molecular weight less than about 40,000 and an elastomer having an average molecular weight greater than 43,000.

The polymerizable ethylenic monomer is preferably in the form of one or more liquid monomers having at least one ethylenically-reactive

group per molecule. Preferred polymerizable ethylenic monomers are those having the general formula $$CH_2 = CH - R$$

wherein R is a group selected from the group consisting of phenyl and substituted derivatives thereof wherein the substituent may be a lower alkyl group (e.g., methyl, ethyl, propyl, etc.), a halogen group, etc., or a group of the formula $$-\overset{O}{\underset{\|}{C}}-O-R_1$$

wherein $R_1$ is $C_1$ to $C_5$ alkyl (e.g., methyl, ethyl, propyl, etc.).

The mono- or polyfunctional organic acid or anhydride containing one double bond per molecule is preferably an aliphatic carboxylic acid containing 3 to 10 carbon atoms and 1 to 2 carboxyl groups per molecule. Preferred acids and anhydrides include acrylic acid, methacrylic acid, 3-butenoic acid, maleic anhydride, fumaric acid, etc.

The elastomers employed in producing the thermoplastic resin in the practice of this invention should comprise at least two elastomers, each of which has a different molecular weight. In the preferred practice of the invention, one elastomer should be an unsaturated elastomeric polymer having a molecular weight ranging from 43,000 to about 380,000 and the second elastomeric polymer should be an unsaturated polymer having an average molecular weight ranging from about 500 to about 40,000. (The molecular weights specified herein are weight molecular weights.) The high molecular weight elastomer, that is, one having an average molecular weight ranging from about 43,000 to about 380,000, is one which is soluble in the polymerizable ethylenic monomer employed and contains at least 10% by weight of a conjugated diene. Preferred unsaturated elastomers include polybutadienes, copolymers of butadiene with at least one ethylenic polymerizable monomer such as styrene, acrylonitrile and mixtures thereof (e.g., butadiene styrene rubbers), polyisoprenes, polychloroprenes, copolymers of isoprene or chloroprene with styrene and/or acrylonitrile as well as mixtures of such polymers. The low molecular weight unsaturated elastomer can be of the same or a different type, but should have an average molecular weight ranging from about 500 to about 40,000. It is likewise soluble in the polymerizable ethylenic monomer and contains at least 10% by weight of a conjugated diene.

It is sometimes desirable, and often preferable, to include in the reactive mixture used to prepare the thermoplastic polymer a comonomer to improve the pigmentability of the final molded product, coating adhesion of the molded product, surface gloss of the molded product and the like. Such comonomers include alkyl acrylates and methacrylates wherein the alkyl groups contain 1 to 5 carbon atoms, acrylonitrile, vinyl pyridine and the like as well as mixtures thereof.

In the preparation of a thermoplastic polymer used in the practice of this invention, there is usually formed a reaction mixture containing about 15 to about 99% by weight of at least one polymerizable ethylenic monomer as defined, about 0.1 to 5% by weight of the mono- or polyfunctional organic acid or anhydride, from about 0.1 to about 7.5% by weight of the unsaturated elastomer having a molecular weight in excess of 43,000 and about 0.1 to 15% by weight of the unsaturated elastomer having a molecular weight less than 40,000. Polymerization of the reaction is then effected in accordance with conventional procedures, preferably using free radical conditions. Preferred catalysts to achieve free radical conditions are the organic peroxides such as benzoyl peroxide or like free radical initiators such as azo-bis (isobutyronitrile) and the like. Normally, the polymerization reaction is terminated before 50% conversion, and preferably at a level of 30-40% conversion, as indicated by the solids content of the reaction mixture. To achieve such control of the polymerization reaction, it is normally carried out at a temperature ranging from 100° to 200° F, and is conveniently terminated by the addition of an inhibitor such as toluhydroquinone, hydroquinone, the methyl ether of hydroquinone and like inhibitors, all of which are well known to those skilled in the art.

Where use is made of the comonomer of the type described above to further improve the properties of the final molded product, the reaction mixture used in the preparation of the thermoplastic polymer can contain up to 50% by weight of the comonomer.

In a preferred embodiment of the present invention, the thermoplastic polymer is prepared by the interpolymerization of about 3% by weight of the organic acid, about 0.5 to about 5% by weight of an unsaturated elastomer having a molecular weight ranging from about 60,000 to 200,000 and about 0.5 to about 9% by weight of an unsaturated elastomer having a molecular weight within the range of about 500 to about 40,000, 0 up to about 40% by weight of the comonomer and about 35 to about 96% by weight of the polymerizable ethylenic monomer. In that preferred embodiment, use is preferably made of acrylic acid as the organic acid, a styrene butadiene rubber having a molecular weight of about 100,000 as the high molecular weight unsaturated elastomer, a hydroxy-terminated polybutadiene having a molecular weight of about 1,000 as the low molecular weight unsaturated elastomer and styrene as the polymerizable ethylenic monomer.

The molding composition of the invention also includes an unsaturated compound which serves as a solvent for both the unsaturated prepolymer and as a solvent for the thermoplastic polymer. The unsaturated compound also is one capable of cross linking the prepolymer, and thus should contain at least one polymerizable ethylenic group per molecule. Preferred unsaturated compounds are those having the formula:

$$CH_2 = CH - O R$$

where R is defined above. The unsaturated compound can therefore be the same as or different from the polymerizable ethylenic monomer empolyed in the preparation of the thermoplastic polymer. It is frequently preferred, however, that the polymerizable ethylenic monomer employed in the preparation of the thermoplastic polymer and the unsaturated compound which serves as a cross linking agent for the prepolymer be the same. Styrene is generally the preferred unsaturated compound, and it is likewise preferred as the polymerizable ethylenic monomer used in the preparation of the thermoplastic polymer.

The non-reactive solvent employed in the molding composition in this invention is preferably an aromatic hydrocarbon which is neither reactive in the system nor with any of the compounds of the system. The non-reactive solvent should be compatible with the system to the extent that it does not cause agglomeration within the system when it is added thereto, although it need not be compatible with either the thermosetting resin or the thermoplastic polymer, individually. In the preferred practice of the invention, the non-reactive solvent employed has a boiling point ranging from about 25° C to about 250° C, and preferably within the range of from about 35° C to about 160° C. Aromatic hydrocarbons, such as benzene and toluene, are preferred, although use can be made of aliphatic hydrocarbons and aliphatic polar solvents. Suitable non-reactive solvents, other than benzene and toluene, include xylene, isopropanol, hexane, aliphatic ketones, such as acetone or methyl ethyl ketone, as well as mixtures thereof.

The relative proportions between the thermosetting prepolymer and the thermoplastic polymer can be varied within relatively wide limits. It is generally desirable to employ a blend of thermoplastic polymer to thermosetting prepolymer having a weight ratio ranging from about 1:1 to about 1:10. The preferred range is about one part by weight of the thermoplastic polymer to about 2 to 5 parts by weight of the thermosetting prepolymer, with the most preferred proportions being a ratio of one part by weight of the thermoplastic polymer to about three parts by weight of the thermosetting prepolymer.

In actual practice, the thermosetting prepolymer is added to the molding composition in the form of a syrup dispersed in the unsaturated solvent, the unsaturated solvent constituting between about 20 to about 40% by weight of the syrup. Similarly, the thermoplastic polymer prepared as described above is likewise in the form of a syrup, containing about 50 to about 75% by weight of the polymerizable ethylenic monomer. On that basis, the syrups are blended together such that the polyester syrup constitutes from about 50 to about 80% by weight and the thermoplastic polymer syrup constitutes between about 20 to about 50% by weight, each based on the total of the thermoplastic polymer syrup and the thermosetting prepolymer syrup.

The amount of the non-reactive solvent employed can likewise be varied within relatively wide limits. In general, the non-reactive solvent is employed in an amount ranging from about 2.5 to about 35% by weight based upon the total of the solids of the thermoplastic polymer and the thermosetting prepolymer and preferably ranging from about 7 to about 15% by weight.

The order of mixing of the various components is not critical, and can be carried out as desired. In formulating the final molding composition, it is also possible, and frequently desirable, to include gelling agents, fillers and reinforcements and the like. The preferred reinforcements are glass fibers which, by reason of their flexibility, high strength and relative inertness, serve to significantly increase the strength of the final molded and cured article produced from the molding composition. In the final molded product, the unsaturated thermosetting prepolymer is cross linked with the unsaturated solvent under conventional conditions including a free radical catalyst, to form a cross linked thermoset resin in the form of a cross linked polyester in which the elastomer-based thermoplastic polymer is present as a dispersed phase. The molded articles produced from the molding composition of the invention are characterized by significantly improved shrinkage characteristics and improved surface characteristics.

Having described the basic concepts of the invention, reference is now made to the following examples, which are provided by way of illustration and not by way of limitation, of the practice of the invention in the preparation of the thermosetting prepolymer, the thermoplastic polymer and molding compositions prepared therefrom.

EXAMPLE 1

This example illustrates the preparation of a thermosetting polyester resin syrup for use in the molding composition of this invention.

The thermosetting polyester resin syrup was prepared from the following recipe in the following manner:

| Materials | Parts by Weight |
|---|---|
| Propylene Glycol | 578.2 |
| Maleic Anhydride | 674.4 |
| Tolehydroquinone solution (25% solution in styrene) | 6.8 |

The polyester resin syrup was prepared by charging all of the propylene glycol and one-third of the maleic anhydride to a reaction vessel, equipped with means for continuously supplying a nitrogen purge stream. The temperature of the reactants in the vessel was raised to about 190° F and, after about four hours, one-half of the toluhydroquinone solution was added.

The reaction was continued until an acid value of about 35 was reached, and then the remainder of the toluhydroquinone solution was added. Next, the remainder of the maleic anhydride was added at a rate of b 10 to 15 parts per minute, while controlling the temperature of the reaction mixture at about 300° F.

Thereafter, the temperature of the reaction mixture was held at 310°–320° F for sixty minutes, after which the temperature was increased to 400° F.

The reaction product at this point had an acid number of 29 to 32. An aliquot of the reaction produced was removed and diluted with styrene at a ratio of two parts by weight of polyester to one part by weight of styrene; the diluted reation product thus had a viscosity of 21 to 25 SSU at 350° F.

Then, the contents of the reactor were cooled to 320° F and diluted with styrene in a ratio such that 10 parts by weight of styrene were added for each 90 parts by weight of polyester reaction product. The diluted reaction product remained stable for 30 minutes at 120° C before gelling.

In another vessel, 486.4 parts by weight styrene and 0.125 parts by weight of t-butyl hydroquinone were mixed, and maintained at a temperature ranging from 130°–145° F. Thereafter, 1138 parts of the polyester resin described above were added at a temperature of 330° F to the styrene-t-butyl hydroquinone mixture to produce a thinned, polyester syrup. That syrup had a viscosity of 1500–2000 cps at 180° F, a maximum water content of 0.08 weight percent and a monomer content ranging from about 30 to about 34 percent by weight.

EXAMPLE 2

This example illustrates the preparation of a thermoplastic polymer for use in the practice of this invention in the preparation of a molding composition embodying the concepts of the invention.

A series of four different unsaturated elastomers are employed in this invention in the preparation of a thermoplastic polymer. The elastomers used are tabulated in Table I.

TABLE I

| Elastomer | Elastomer Data | | Molecular Weight | |
|---|---|---|---|---|
| | Manufacturer | Polymer Type | No. Average | Weight Average |
| Lithene QH | Lithcoa | Polybutadiene* | — | 500 – 1000 |
| Solprene 1205C | Phillips | 25/75 S/B (Block) | 68,000 | 83,000 |
| Solprene 1206 | Phillips | 25/75 S/B (Random) | 122,000 | 212,000 |
| PolyBDR-45-HT | Arco | Polybutadiene** | — | 500 – 1000 |

Phillips — Phillips Petroleum Co.
Lithcoa — Lithium Company of America
Arco — Arco Chemical Co.
S/B — styrene-butadiene polymer
*This polybutadiene has a microstructure of 30% trans 1,4, 35% cis 1,4 and 35% vinyl 1,2.
**This polybutadiene has a microstructure of 60% trans 1,4, 20% cis 1,4 and 20% vinyl 1,2.

A series of thermoplastic polymers are prepared by interpolymerization of styrene, acrylic acid, a high molecular weight unsaturated elastomer and a low molecular weight unsaturated elastomer as defined above. In each thermoplastic polymer, the high and low molecular weight unsaturated elastomers constituted about 7.3 parts by weight per 100 parts by weight of the total of the styrene, acrylic acid and both elastomers.

A typical thermoplastic polymer is prepared from Solprene 1205C (a styrene-butadiene block copolymer containing 25% by weight styrene and 75% by weight butadiene) having a weight average molecular weight of 83,000 as the high molecular weight unsaturated elastomer and Poly BD R-45-HT (a butadiene homopolymer having a weight average molecular weight ranging from 500-100) as the low molecular weight polymer in accordance with the following recipe:

| Material | Parts by Weight |
|---|---|
| Styrene | 17,700 |
| Solprene 1205C* | 6,650 |
| Poly BD R-45-HT | 1,410 |
| Acrylic Acid | 312 |
| Benzoyl Peroxide | 37 |
| Toluhydroquinone | 10 |

* 7.5 weight % elastomer in styrene

Each of the above components was charged to the reactor, except for the benzoyl peroxide and toluhydroquinone. The reaction vessel was then sparged with nitrogen at 0.055 CFM, and heated to 158° F. The benzoyl peroxide was then added to the reactor, and polymerization was carried out, with a measurement of the solids content of the reaction vessel being made every 30 minutes.

When the solids content had reached 36 ± 2%, indicating the extent of conversion, the toluhydroquinone was added to inhibit further polymerization, and the reaction mixture was adjusted to a solids content of about 33% by weight by the addition of styrene.

The result was a thermoplastic polymer syrup.

EXAMPLE 3

This example illustrates the preparation and testing of molding compounds embodying the features of this invention.

Using the thermosetting polyester syrup prepared as described in Example 1 and the thermoplastic polymer from Solprene 1205C and Poly BD R-45-HT as specifically described in Example 2 and benzene as the non-reactive solvent, a series of molding compounds are prepared in accordance with the following recipe:

TABLE II

| Blend | Composition, Parts by Weight | | | |
|---|---|---|---|---|
| | I | II | III | IV |
| Thermoplastic Syrup | 560 | 554.4 | 532 | 504 |
| Thermosetting Syrup | 840 | 840 | 840 | 840 |
| Hydrocarbon | 0 | 5.6 | 28 | 56 |
| t-butyl perbenzoate | 14 | 14 | 14 | 10 |
| Zinc Stearate | 52 | 52 | 52 | 52 |
| Calcium Carbonate | 2079 | 2079 | 2079 | 2079 |
| ¼" Glass filler | 1541 | 1548 | 1548 | 1548 |
| Pigment | 0 | 100 | 100 | 100 |
| Magnesium Hydroxide | 42 | 42 | 42 | 42 |
| Hydrocarbon as Percent of Thermoplastic Syrup and Hydrocarbon | 0 | 1 | 5 | 10 |

In each case, the thermoplastic syrup and the hydrocarbon were blended together, and the thermosetting polyester resin was mixed into the resulting mixture. The calcium carbonate was added to form a smooth paste. The magnesium hydroxide was added to the paste, and mixing was continued for two minutes. The chopped glass was then added and mixing was continued for an additional 2.5 minutes. Thereafter, the mixture was aged for approximately 48 hours at room temperature.

Each blend was subsequently molded into a 12 inches × 12 inches flat sheet, with a molding pressure of approximately 1000 psi and a platen temperature within the range of from about 270° to 300° F; the cure cycle was 2.5 to 3.0 minutes. All sheets were then measured for shrink in relation to the cold mold in the 12 inches axis of the sheet.

Shrink data were as follows:

TABLE III

| Blend | I | II | III | IV |
|---|---|---|---|---|
| Shrink, mils/in. | 0.72 | 0.56 | 0.44 | 0.23 |
| Shrink, mils | 8.6 | 6.6 | 5.3 | 2.8 |
| % Reduction in Shrink basis I | — | 23 | 38 | 67 |

It will be appreciated that the presence of the pigment in Blends II, III and IV would be expected to increase the shrinkage of those blends. However, this expected increase in shrinkage is more than offset by the presence of the hydrocarbon in accordance with the concepts of the invention.

EXAMPLE 4

This example illustrates the effect on shrinkage of varying the amount of non-reactive solvent present in the molding composition.

Using the same formulations as described in Example 3, a further series of molding compounds are prepared, varying only the amount of thermoplasitc syrup, the amount of the thermosetting polyester syrup and the benzene as the nonreactive solvent. (For convenience and ease of illustration, the complete formulations are not repeated below, with only the quantities of the thermoplastic syrup, the thermosetting polyester syrup and the benzene being specified.)

TABLE IV

| Blend | Composition, Parts by Weight | | | | |
|---|---|---|---|---|---|
| | V | VI | VII | VIII | IX |
| Thermoplastic syrup | 476 | 448 | 392 | 336 | 280 |
| Thermosetting syrup | 840 | 840 | 840 | 840 | 840 |
| Benzene | 84 | 112 | 168 | 224 | 280 |
| Shrinkage Data | | | | | |
| Mils/inch | 0.47 | 0.13 | 0.10 | 0.32 | 0.81 |

The above data illustrate the effectiveness of benzene as a non-reactive solvent over the range of 6 to 25%, based on the total of the thermoplastic and thermosetting polyester syrups.

EXAMPLE 5

Using the same procedure as described in Example 4, the following amounts of thermoplastic resin syrup and thermosetting resin syrups were employed, with various non-reactive solvents in the amounts with the following results when molded as described above.

TABLE V

| Blend | Composition, Parts by Weight | | | | | |
|---|---|---|---|---|---|---|
| | X | XI | XII | XIII | XIV | XV |
| Thermoplastic Syrup | 504 | 476 | 476 | 476 | 476 | 476 |
| Thermosetting Syrup | 840 | 840 | 840 | 840 | 840 | 840 |
| Non-reactive solvent | 56 | 84 | 84 | 84 | 84 | 84 |
| | (Benzene) | (Hexane) | (Acetone) | (MEK)* | (Toluene) | (IPA)** |
| Shrinkage, mils/in. | 0.49 | 0.45 | 0.64 | 0.51 | 0.12 | 0.53 |

* MEK — methyl ethyl ketone
** IPA — isopropanol

In each case except X, the non-reactive solvent is employed in an amount corresponding to 15% by weight, based upon the total weight of the resin syrups. The data demonstrates that toluene is the most effective of those non-reactive solvents tested. Benzene, however, is often preferred because it, too, is likewise quite effective, and is more readily available and less expensive as compared to toluene.

It will be understood that various changes and modifications can be made in the details, procedure, formulation and use without departing from the spirit of the invention, especially as defined in the following claims.

We claim:
1. A molding composition comprising:
   (1) an unsaturated, thermosetting prepolymer;
   (2) a thermoplastic polymer prepared by interpolymerization of
      (a) at least one polymerizable ethylenic monomer,
      (b) an organic acid or anhydride containing at least one carboxyl group and one double bond per molecule,
      (c) an unsaturated elastomer having a weight average molecular weight less than 40,000, and
      (d) an unsaturated elastomer having a weight average molecular weight greater than 43,000 wherein each elastomer contains at least 10% by weight of a conjugated diene;
   (3) at least one unsaturated compound which is a solvent for the prepolymer and the thermoplastic polymer and which is capable of cross-linking the prepolymer; and
   (4) a non-reactive solvent, with the thermoplastic polymer and the non-reactive solvent each being present in a combined amount sufficient to reduce shrinkage on cross-linking of the prepolymer with the unsaturated compound.

2. A molding composition as defined in claim 1 wherein the prepolymer is an unsaturated polyester resin.

3. A molding composition as defined in claim 1 wherein the prepolymer is an unsaturated thermosetting polyester resin prepared by condensation of an alpha, beta-ethylenically unsaturated dicarboxylic acid or anhydride with a polyhydric alcohol.

4. A molding composition in claim 1 wherein the polymerizable ethylenic monomer is a compound having the formula:

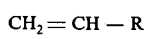

wherein R is selected from the group of phenyl and substituted derivatives thereof, a halogen atom or a group of the formula:

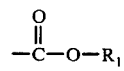

wherein $R_1$ is an alkyl group.

5. A molding composition as defined in claim 1 wherein the polymerizable ethylenic monomer is styrene.

6. A molding composition as defined in claim 1 wherein the organic acid or anhydride is selected from aliphatic carboxylic acids and their anhydrides containing 3 to 10 carbon atoms and 1 to 2 carboxyl groups per molecule.

7. A molding composition as defined in claim 1 wherein the organic acid or anhydride is maleic anhydride.

8. A molding composition as defined in claim 1 wherein (c) has an average molecular weight ranging from about 500 to about 40,000.

9. A molding composition as defined in claim 1 wherein (d) has an average molecular weight ranging from about 43,000 to about 380,000.

10. A molding composition as defined in claim 1 wherein each of (c) and (d) contain at least 10% by weight of a conjugated diene selected from the group consisting of butadiene, chloroprene and isoprene.

11. A molding composition as defined in claim 1 wherein the thermoplastic polymer is prepared by interpolymerizing a comonomer, said comonomer being selected from the group of alkyl acrylates and methacrylates, acrylonitrile and vinyl pyridine.

12. A molding composition as defined in claim 1 wherein the thermoplastic polymer is prepared by interpolymerization of 15 to about 99% by weight of the polymerizable ethylenic monomer, about 0.1 to 5% by weight of the organic acid or anhydride, about 0.1 to 7.5% by weight of (d) and about 0.1 to 15% by weight of (c).

13. A molding composition as defined in claim 1 wherein the thermoplastic polymer is prepared by terminating the polymerization reaction before 50% conversion is reached, as determined by the solids content of the polymerization mixture.

14. A molding composition as defined in claim 1 wherein the organic acid or anhydride is acrylic acid.

15. A molding composition as defined in claim 1 wherein the unsaturated compound is a compound having the formula $$CH_2 = CH - R$$

wherein R is selected from the group of phenyl and substituted derivatives thereof, a halogen atom or a group of the formula:

$$-\overset{O}{\underset{\|}{C}}-O-R_1$$

wherein $R_1$ is an alkyl group.

16. A molding composition as defined in claim 1 wherein the unsaturated compound is the same as the polymerizable ethylenic monomer.

17. A molding composition as defined in claim 1 wherein the unsaturated compound is styrene.

18. A molding composition as defined in claim 1 wherein the non-reactive solvent is a normally liquid organic compound which does not cause agglomeration of the components of the molding composition and has a boiling point ranging from about 25° C to about 250° C.

19. A molding composition as defined in claim 1 wherein the non-reactive solvent is selected from the group consisting of toluene and benzene.

20. A molding composition as defined in claim 1 wherein the composition contains the thermoplastic polymer and the thermosetting prepolymer in a weight ration ranging from about 1:1 to about 1:10.

21. A molding composition as defined in claim 1 wherein the non-reactive solvent is present in an amount ranging from about 2.5 to about 35% based upon the total of the solids of the thermoplastic polymer and the thermosetting prepolymer.

22. A molding composition as defined in claim 1 which includes reinforcing fillers.

23. A molding composition as defined in claim 22 wherein the fillers comprise glass fibers.

24. A method for the preparation of a molding composition comprising
 (1) blending together
  (A) an unsaturated thermosetting prepolymer
  (B) a thermoplastic polymer prepared by interpolymerization of
   (a) at least one polymerizable ethylenic monomer,
   (b) an organic acid or anhydride containing at least one carboxyl group and one double bond per molecule,
   (c) an unsaturated elastomer having a weight average molecular weight less than 40,000, and
   (d) an unsaturated elastomer having a weight average molecular weight greater than 43,000 wherein each elastomer contains at least 10% by weight of a conjugated diene;
  (C) at least one unsaturated compound which is a solvent for the prepolymer and the thermoplastic polymer and which is capable of cross-linking the prepolymer; and
  (D) a non-reactive solvent,
 (2) and adding fillers to the resulting blend.

25. A method as defined in claim 24 wherein the fillers comprise glass fibers.

26. A method for molding glass fiber reinforced plastics comprising
 (1) blending together
  (A) an unsaturated thermosetting prepolymer
  (B) a thermoplastic polymer prepared by interpolymerization of
   (a) at least one polymerizable ethylenic monomer,
   (b) an organic acid or anhydride containing at least one carboxyl group and one double bond per molecule,
   (c) an unsaturated elastomer having a weight average molecular weight less than 40,000, and
   (d) an unsaturated elastomer having a weight average molecular weight greater than 43,000 wherein each elastomer contains at least 10% by weight of a conjugated diene;
  (C) at least one unsaturated compound which is a solvent for the prepolymer and the thermoplastic polymer and which is capable of cross-linking the prepolymer; and
  (D) a non-reactive solvent,
 (2) adding fillers to the resulting blend,
 (3) adding a free radical catalyst to the resulting blend, and
 (4) molding the resulting composition to form a molded article.

* * * * *